(12) United States Patent
Kuo

(10) Patent No.: US 7,101,227 B2
(45) Date of Patent: Sep. 5, 2006

(54) CARD CONNECTOR

(75) Inventor: Ming-Lun Kuo, Tu-Chen (TW)

(73) Assignee: Hon Hai Precision Ind. Co., Ltd., Taipei Hsien (TW)

( * ) Notice: Subject to any disclaimer, the term of this patent is extended or adjusted under 35 U.S.C. 154(b) by 0 days.

(21) Appl. No.: 10/982,309

(22) Filed: Nov. 5, 2004

(65) Prior Publication Data
US 2005/0106944 A1    May 19, 2005

(30) Foreign Application Priority Data
Nov. 18, 2003  (TW)  ............................. 92220363 U

(51) Int. Cl.
*H01R 24/00*  (2006.01)

(52) U.S. Cl. ..................................... 439/630

(58) Field of Classification Search ............. 439/64, 439/377, 630
See application file for complete search history.

(56) References Cited

U.S. PATENT DOCUMENTS

| 4,639,054 A | * | 1/1987 | Kersbergen | ................. | 439/59 |
| 6,058,018 A | | 5/2000 | Gerrits et al. | | |
| 6,269,005 B1 | | 7/2001 | Tung et al. | | |
| 7,011,533 B1 | * | 3/2006 | Miyamoto | ................. | 439/95 |

* cited by examiner

*Primary Examiner*—Khiem Nguyen
(74) *Attorney, Agent, or Firm*—Wei Te Chung

(57) ABSTRACT

A card connector (100) comprises an insulated housing (10), a plurality of electrical contacts (20), an L-shaped shield member (30) assembled in the housing and a guide member (40) located in the shield member. The shield member comprises a main portion (31) and a pair of lateral portions (35, 38) each comprising a guide groove (354, 384) and an L-shaped receiving space (39) surrounded by the main portion and the pair of lateral portions. Each lateral portion has a plurality of tabs (36) projecting into the guide groove. The guide member has a guide channel (16) parallel to and laterally offset from the guide grooves.

16 Claims, 5 Drawing Sheets

CARD CONNECTOR

BACKGROUND OF THE INVENTION

1. Field of the Invention

The present invention is generally related to an electrical connector, and more particularly, to an electrical connector which is used in notebook computers for receiving a printed circuit card.

2. Description of Related Art

As is known to us, previously, a number of manufacturers produced a variety of printed circuit cards according to different standards for meeting the needs of different electronic devices. However, with the trend of integration, the disadvantages of this kind of operation are exposed to us, the cards provided by different manufacturers are incompatible with each other, which results in poor performance of interchanging information. For solving the problem, three types of cards defined by the Personal Computer Memory Card International Association (PCMCIA) are developed, they are classified as type I, type II and type III depending on the thickness of the card. Originally, the standard cards are mainly used in servers, and when the notebook develops in the miniaturization and portability trend, these standard cards are widely served as Input/Output interfaces in the notebook computers or other related electronic devices.

With the development of the technologies, the standard cards are highly needed to be improved in many aspects, such as transmitting capacity and transmitting speed. Therefore, the Personal Computer Memory Card International Association (PCMCIA) is drafting a new standard for cards which are presently required by electronic devices. The developing new card mainly has two advantages. On the one hand, the transmitting speed is highly improved and even can reach 250 million bits per second of single-end or 500 million bits per second of double-end. Thus, the transmitting speed of the new card is four times of that of a conventional 32 bits card. On the other hand, the volume of the new card is relatively small compared to the conventional card. Referring to FIG. 1, it shows a first new card 50 and a second new card 60. The first new card 50 has a same thickness as the second new card 60. The first new card 50 and the second new card 60 respectively have an identically shaped mating portion 51, 61. The size of the first new card 50 is only one half of that of the conventional card, while the second new card is L-shaped. Thus, the first new card 50 and the second new card 60 are easily distinguished from the conventional card.

Generally, the card is assembled into an electronic device via a card connector mating with the card. The new card has a shape different from the conventional cards and a conventional card connector thus cannot mate with the new cards. New card connector should be designed to match the improvement of the cards. At present, two types of card connectors are needed to respectively mate with the first new card and the second new card. Further, all electronic devices are presently developed toward miniaturization, including notebook computers. A card connector which can respectively mates with the two types of the new cards and occupy the least space of a notebook computer in which the new card is assembled is highly required.

SUMMARY OF THE INVENTION

Accordingly, an object of the present invention is to provide a card connector which can be used for respectively receiving two types of new printed circuit cards.

In order to achieve the object set forth, a new card connector is provided. The card connector comprises an insulated housing, a plurality of electrical contacts, a shield member and a guide member having a guide channel. The shield member comprises an L-shaped main portion, a pair of lateral portions formed at lateral sides of the main portion and an L-shaped receiving space surrounded by the main portion and the pair of lateral portions. Each lateral portion has a guide groove and a plurality of tabs projecting into the guide groove. An L-shaped new card is guided by the guide grooves of the shield member and the guide channel of the guide member to be inserted into the card connector to electrical contact with the electrical contacts, and another new card which has a smaller size than the L-shaped new card can be also guided by the guide channel and the guide groove which is opposite to the guide channel to be received in the card connector.

Other objects, advantages and novel features of the present invention will be drawn from the following detailed description of a preferred embodiment of the present invention with attached drawings.

DETAILED DESCRIPTION OF THE INVENTION

Reference will now be made in detail to the preferred embodiment of the present invention.

Figure 2:
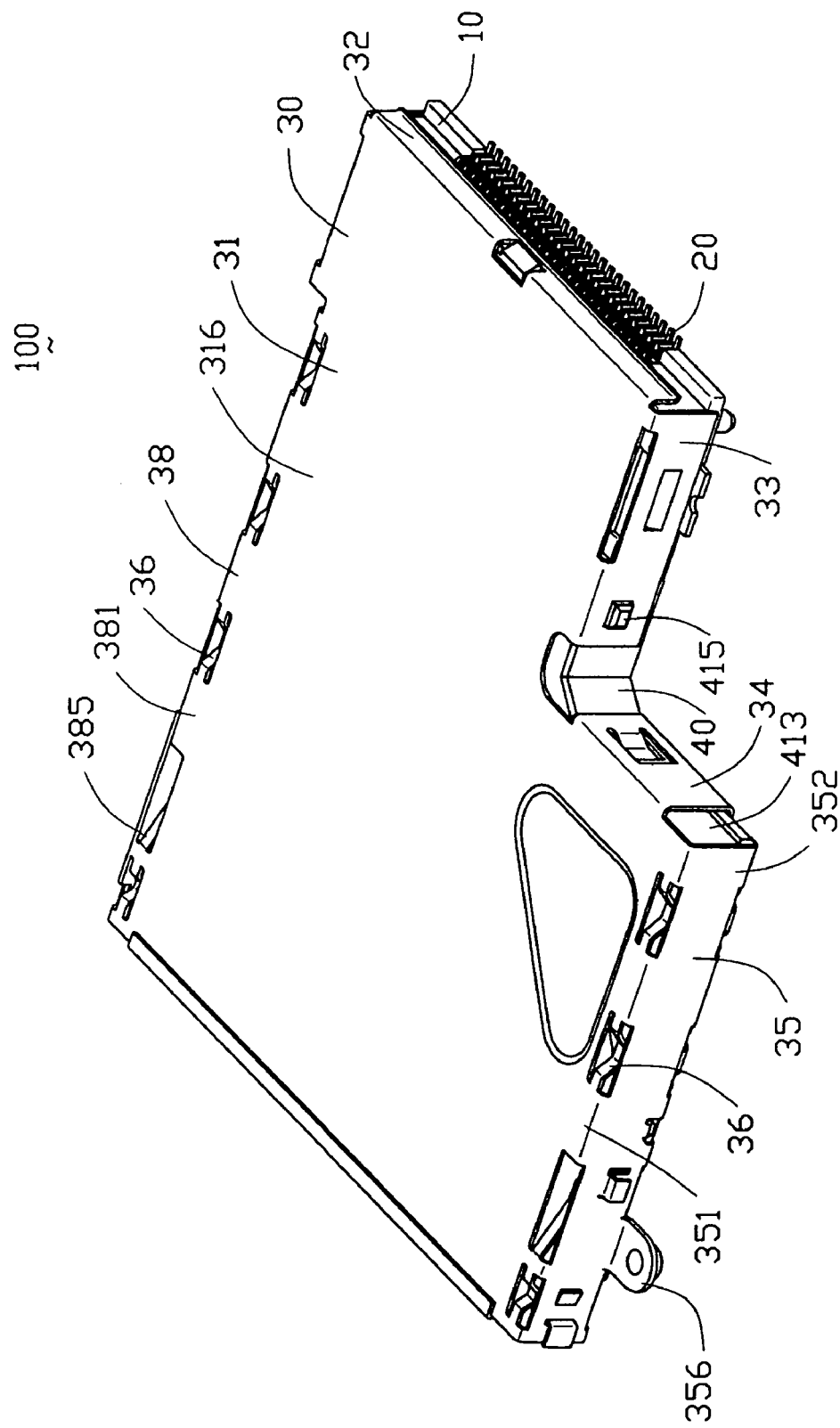
FIG. 2 is a perspective view of the card connector.

Referring to FIG. 2, a card connector 100 in accordance with the present invention comprises an insulated housing 10, a plurality of electrical contacts 20 received in the housing 10, a shield member 30 assembled to the housing 10 and a guide member 40.

Figure 1:
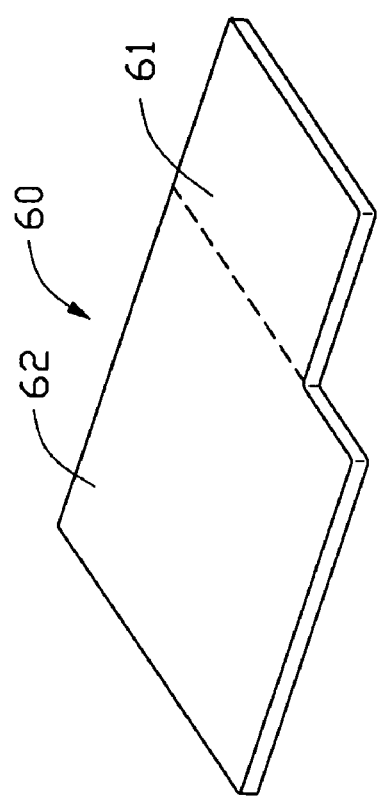
FIG. 1 is a schematic view of a first new card and a second new card for mating with a card connector in accordance with the present invention.
Figure 1:
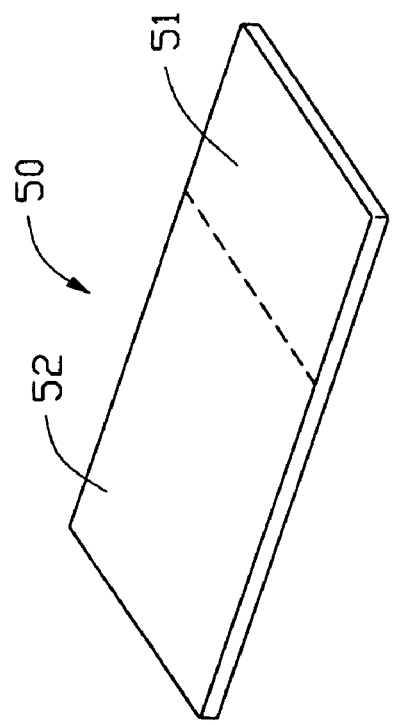
Figure 3:
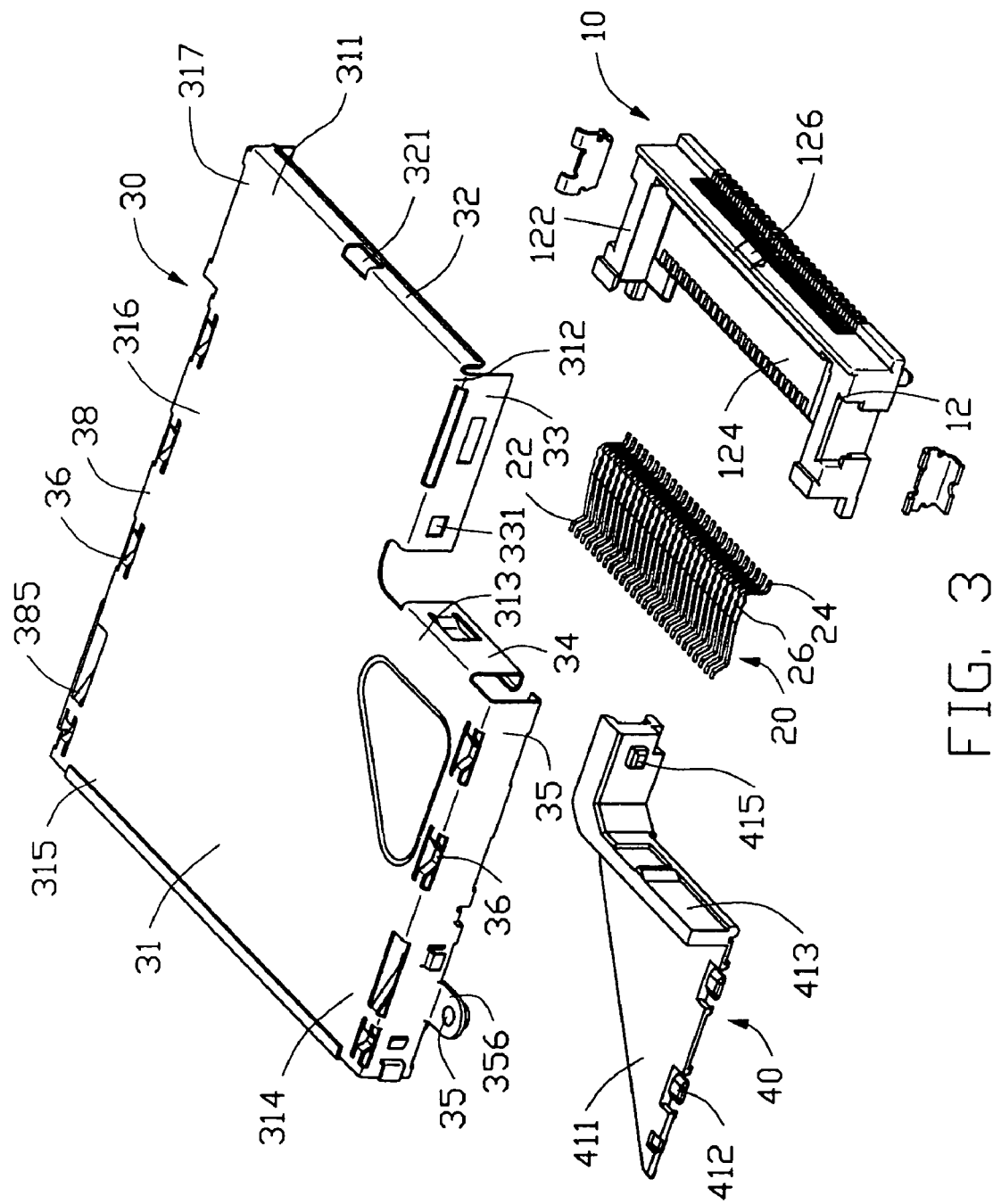
FIG. 3 is an exploded, perspective view of the card connector.

Referring to FIG. 3, the insulated housing 10 is elongate and comprises a mating portion 12 for receiving a first card 50 or a second card 60 (shown in FIG. 1). The mating portion 12 includes a pair of opposite side portions 122 and a bottom portion 124 for connecting the two side portions 122. A bulge 126 projects forwardly from a front wall of the housing 10.

A plurality of electrical contacts 20 are assembled to the housing 10 along a front-to-rear direction. Each electrical contact 20 comprises a contact portion 22 for electrically connecting with the first new card 50 or the second new card 60, a retention portion 26 extending forwardly from the contact portion 22 and a solder portion 24 extending out of the front wall of the housing 10.

Figure 4:
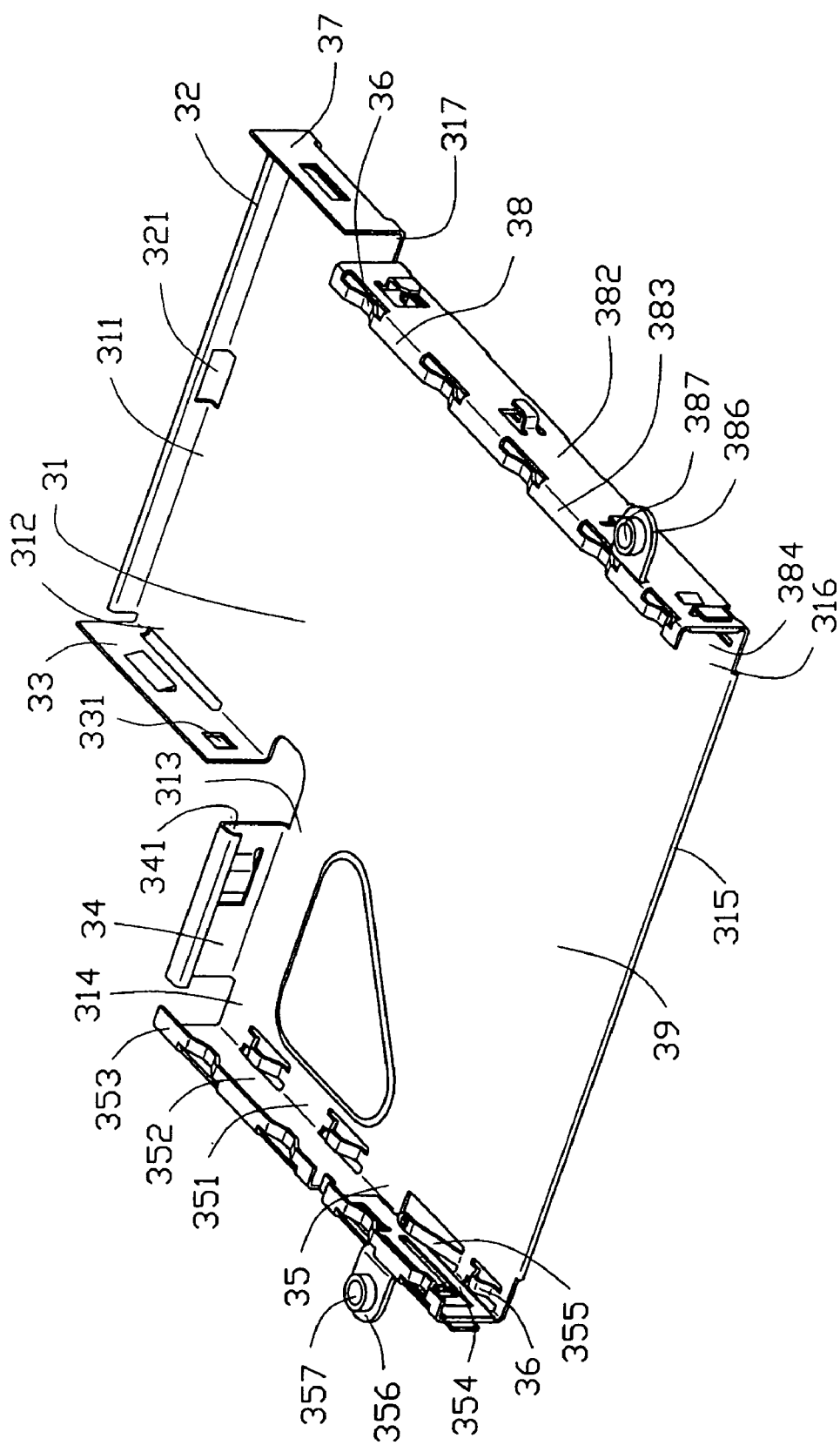
FIG. 4 is a perspective view of a shield member of the card connector.

Referring to FIG. 4 and in conjunction with FIG. 2, the shield member 30 is L-shaped and comprises an L-shaped main portion 31. The main portion 31 includes a first front side 311, a first lateral side 312, a second front side 313, a second lateral side 314, a rear side 315, a third lateral side 316 and a fourth lateral side 317. The first front side 311, the second front side 313 and the rear side 315 extend along a left-to-right direction, while the first lateral side 312, the second lateral side 314, the third lateral side 316 and the fourth lateral side 317 extend along a front-to-rear direction. The first front side 311 has a left portion connecting with a front portion of the first lateral side 312 and a right portion connecting with the fourth lateral side 317. The second front side 313 has two ends respectively adjacent to a rear portion of the first lateral side 312 and a front portion of the second lateral side 314. The rear side 315 is served as a connection between a rear portion of the second lateral side 314 and a rear portion of the third lateral side 316. The third lateral side 316 and the fourth lateral side 317 are located in the same side of the main portion 31 of the shield member 30, but they are disconnected with each other.

A barrier 32 extends downwardly from the first front side 311 to abuts against a front surface of the housing 10. A connect portion between the barrier 32 and the first front side 311 has an opening 321 engaging with the bulge 126 of the housing 10. A first sidewall 33 extends downwardly from the first lateral side 312 and covers one side portion 122 of the mating portion 12 of the housing 10, and the first sidewall 33 defines an aperture 331 at a rear portion thereof. A receiving portion 34 extends downwardly from the second front side 313 and has a receiving groove 341. A first lateral portion 35 extends from the second lateral side 314 and comprises a first horizontal portion 351 extending horizontally from the second lateral side 314, a vertical portion 352 extending downwardly from the first horizontal portion 351 and a second horizontal portion 353. The first horizontal portion 351 defines a plurality of arced tabs 36 projecting downwardly, while the second horizontal portion 353 defines a plurality of arced tabs 36 projecting upwardly. A guide groove 354 is formed therein and surrounded by the first horizontal portion 351, the vertical portion 352 and the second horizontal portion 353. The first horizontal portion 351 has a resilient arm 355 formed at the rear portion thereof and between two tabs 36. The second horizontal portion 353 has a positioning portion 356 extending horizontally from an end thereof which is adjacent to the vertical portion 352 and away from the second horizontal portion 353. The positioning portion 356 defines a positioning hole 357.

A second sidewall 37 extends downwardly from the fourth lateral side 317 and covers the other side portion 122 of the housing 10. A second lateral portion 38 extends from the third lateral side 316 and comprises a first horizontal portion 381 extending from the third lateral side 316, a vertical portion 382 extending downwardly from the first horizontal portion 381, a second horizontal portion 383 extending toward the second lateral side 314 and a guide groove 384 surrounded by the first and the second horizontal portions 381, 383 and the vertical portion 382. The first horizontal portion 381 has a plurality of arched tabs 36 projecting downwardly and a resilient arm 385 extending downwardly and formed between two tabs 36. The second horizontal portion 383 has a plurality of arched tabs 36 projecting upwardly and a positioning portion 386 extending horizontally away from the second horizontal portion 383 and defining a positioning hole 387.

A receiving space 39 of the shield member 30 is defined by the main portion 31, the barrier 32, the first sidewall 33, the receiving portion 34, the first lateral portion 35, the second lateral portion 38 and the second sidewall 37.

Figure 5:
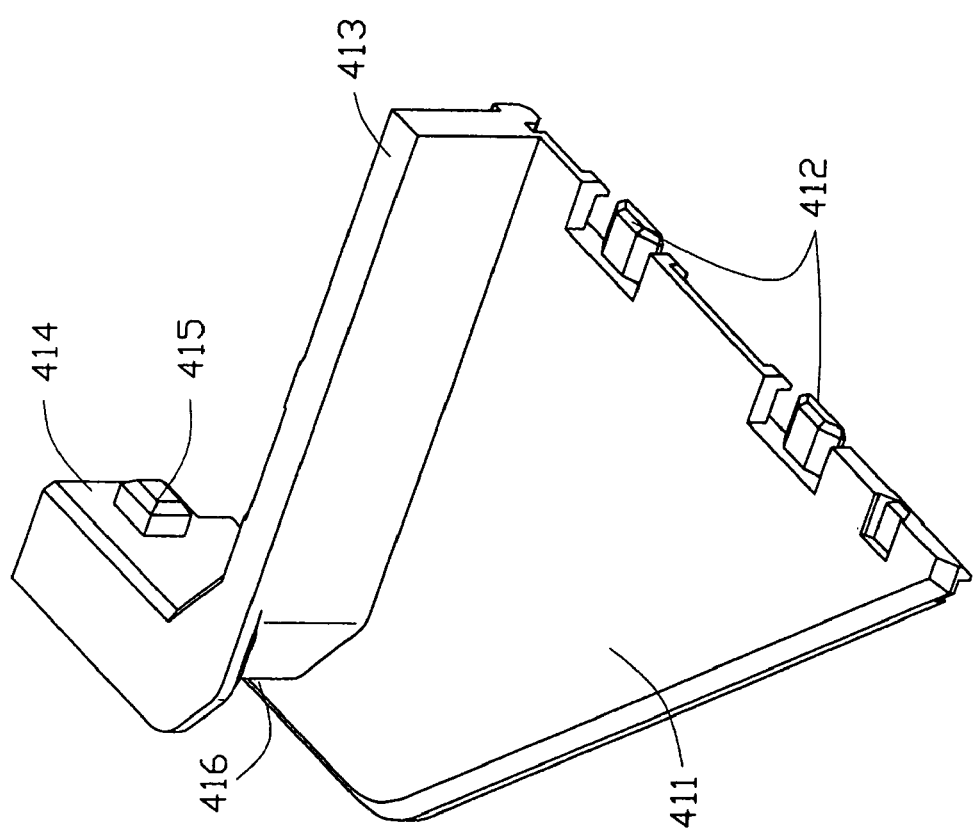
FIG. 5 is a perspective view of a guide member of the card connector.

Referring to FIG. 5, the guide member 40 is mounted into the receiving space 39 of the shield member 30 and engages with the first sidewall 33, the receiving portion 34 and the first lateral portion 35. The guide member 40 includes a triangular main portion 411 engaging with the first lateral portion 35, a latching portion 413 extending vertically from a side of the triangular main portion 411 and a guide portion 414 extending vertically from the latching portion 413. The main portion 411 has a plurality of pads 412 formed at another side thereof. When the guide member 40 is inserted into the shield member 30, the pads 412 are respectively received in a space under the corresponding tab 36 to abut against the tabs 36 of the first lateral portion 35. The latching portion 413 engages with the receiving portion 34 of the shield member 30, wherein a flange portion projecting from a lower portion of the latching portion 413 is received in the receiving groove 341 of the receiving portion 34. The guide portion 414 has a projection 415 projecting from one surface thereof for engaging with the aperture 331 of the first sidewall 33 and a guide channel 416 formed the other surface thereof for leading a printed circuit card to be inserted into the card connector 100 (shown in FIG. 2). The guide channel 416 is parallel to and laterally offsets from the guide grooves 354, 384.

Referring to FIG. 1 and FIG. 4, FIG. 1 shows a first new card 50 and a second new card 60. The first new card 50 and the second new card 60 respectively have a mating portion 51, 61 which are same. The width of a rear portion 62 extending rearwardly from a broken line labeled on the second new card 60 is larger than a width of a rear portion 52 extending rearwardly from a broken line labeled on the first new card 50. The receiving space 39 of the shield member 30 of the connector 100 is L-shaped which is the same as a shape of the second new card 60. Thus, the connector 100 not only can receive the second new card 60 but also can receive the first new card 50.

When the first new card 50 is inserted into the card connector 100, it is guided by the guide groove 384 of the second lateral portion 38 and the guide channel 416 to be received in the receiving space 39, and the mating portion 51 of the first new card 50 is located on the mating portion 12 of the housing 10 to electrically contact with the electrical contacts 20. When the second new card 60 is mounted to the connector 100, it is guided by the guide groove 354 of the first lateral portion 35, the guide groove 384 of the second lateral portion 38 and the guide channel 416 of the guide member 40 to be received in the receiving space 39, and its mating portion 61 is located on the mating portion 12 of the housing 10 to contact with the electrical contacts 20. As the first lateral portion 35 and the second lateral portion 38 respectively have a plurality of tabs 63 projecting into the guide groove 354, 384, the first new card 50 or the second new card 60 presses the tabs 36 to deform resiliently so that the connection between the first new card 50 or the second new card 60 and the shield member 30 is stable and reliable.

It is to be understood, however, that even though numerous characteristics and advantages of the present invention have been set forth in the foregoing description, together with details of the structure and function of the invention, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. A card connector comprising:
   a housing;
   a plurality of electrical contacts being received in the housing;
   a shield member being mounted to the housing and comprising an L-shaped main portion, a pair of lateral portions extending from opposite lateral ends of the main portion, a receiving portion extending along a front-to-rear direction, a barrier extending along a left-to-right direction, a sidewall connecting the receiving portion and the barrier and an L-shaped receiving space surrounded by the main portion, the pair of lateral portions, the receiving portion, the barrier and the sidewall, each lateral portion comprising a guide groove; and a guide member received in the shield member and having a guide channel parallel to and laterally offset from the guide grooves.

2. The card connector as claimed in claim 1, wherein each lateral portion of the shield member comprises a first horizontal portion extending from an end of the main portion, a vertical portion extending downwardly from the first horizontal portion and a second horizontal portion parallel to the first horizontal portion, and wherein the guide channel is surrounded by the first horizontal portion, the vertical portion and the second horizontal portion.

3. The card connector as claimed in claim 2, wherein the first horizontal portion and the second horizontal portion respectively have a plurality of tabs thereon.

4. The card connector as claimed in claim 3, wherein the first horizontal portion has a resilient arm projecting into the guide groove and located between two tabs.

5. The card connector as claimed in claim 1, wherein the shield member has a pair of positioning portions respectively connected with the pair of lateral portions and extending away from the receiving space.

6. The card connector as claimed in claim 5, wherein each positioning portion defines a positioning hole therein.

7. The card connector as claimed in claim 1, wherein the guide member comprises a guide portion, and the guide channel is located on one side of the guide portion.

8. The card connector as claimed in claim 7, wherein the guide portion has a projection extending from the other side thereof, and wherein the sidewall of the shield member defines an aperture for engaging with the projection.

9. The card connector as claimed in claim 8, wherein the guide member comprises a latching portion vertically connected with the guide portion, and wherein the shield member comprises a receiving portion extending from the main portion thereof for receiving a bottom portion of the latching portion.

10. The card connector as claimed in claim 9, wherein the guide member has a main portion comprising a plurality of pads formed at a side thereof for respectively abutting against the tabs of the lateral portion adjacent to the receiving portion.

11. The card connector as claimed in claim 1, wherein the housing has a mating portion and a front wall, and wherein each electrical contact comprising a contact portion located in the mating portion of the housing, a solder portion extending forwardly out of the front wall of the housing and a retention portion connecting the contact portion with the solder portion.

12. The card connector as claimed in claim 11, wherein the front wall of the housing has a bulge projecting therefrom, and the shield member defines an opening latching with the bulge.

13. A card connector comprising:

a housing;

a plurality of electrical contacts being received in the housing;

a metallic shield member, of which the housing is mounted at the end, defining, from a top view, generally a large rectangular configuration with a small rectangular notch configured at a rear corner beside said housing;

said shielding member including:

a first lateral side portion extending along essentially a full length of said shield member in a front-to-back direction;

a second lateral side portion, opposite to said first lateral side portion, extending with a portion of said full length due to said small rectangular notch; and a first guiding groove formed in the first lateral side portion, a second guiding groove formed in the second lateral side portion, and a third guiding groove extending parallel to and between said first guiding groove and said second guiding groove; wherein said third guiding groove is essentially located behind the second guiding groove in said front-to-back direction and laterally beside said small rectangular notch.

14. The card connector as claimed in claim 13, wherein said shield member further includes a side wall adjacent to said third guiding groove.

15. The card connector as claimed in claim 14, wherein said side wall is located beside said small rectangular notch and extending parallel to and between said first and second lateral side portions with a length essentially equal to a difference between a length of said first lateral side portion and that of said second lateral side portion.

16. The card connector as claimed in claim 13, wherein a guiding member is attached to the shield member and configured with a triangular configuration, from the top view, for facilitating insertion of a corresponding card.

* * * * *